(12) United States Patent
Mast et al.

(10) Patent No.: US 7,607,705 B1
(45) Date of Patent: Oct. 27, 2009

(54) REAR BUMPER ASSEMBLY WITH STEP GARNISH

(75) Inventors: Gregory J. Mast, Nashville, TN (US); Nick A. Massaro, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/259,021

(22) Filed: Oct. 27, 2008

(51) Int. Cl.
*B60R 19/44* (2006.01)
(52) U.S. Cl. .................................. 293/117; 293/102
(58) Field of Classification Search .................. 293/117, 293/102
See application file for complete search history.

(56) References Cited

U.S. PATENT DOCUMENTS

| | | | |
|---|---|---|---|
| 6,079,765 A | 6/2000 | Zaguskin et al. | |
| 6,572,161 B2 | 6/2003 | Wild et al. | |
| 6,749,197 B1 | 6/2004 | Miller et al. | |
| 7,234,741 B1 | 6/2007 | Reynolds et al. | |
| 7,377,564 B1 * | 5/2008 | Baffy et al. ................. | 293/117 |

FOREIGN PATENT DOCUMENTS

| | | |
|---|---|---|
| JP | 9048295 | 2/1997 |
| JP | 2001059868 | 3/2001 |
| JP | 2001158284 | 6/2001 |
| JP | 2004278682 | 10/2004 |
| KR | 1020050112273 | 11/2005 |

* cited by examiner

*Primary Examiner*—Joseph D Pape
(74) *Attorney, Agent, or Firm*—Rankin, Hill & Clark LLP (57) ABSTRACT

A rear bumper assembly includes a bumper body having an exterior surface and an interior surface. The bumper body defines at least one aperture therethrough. The at least one aperture is located on an upper portion of the bumper body. A step garnish is received on the upper portion and secured to the bumper body. At least one carrying structure is integrally molded on an underside of the step garnish and received through the at least one aperture for carrying a wire or wire harness along the interior surface of the bumper body. The wire harness can be operatively connected to one or more corner sensors installed on the bumper body.

21 Claims, 6 Drawing Sheets

REAR BUMPER ASSEMBLY WITH STEP GARNISH

BACKGROUND

The present disclosure relates to rear bumper assemblies, and particularly relates to a rear bumper assembly having a step garnish with integrally molded or formed structures that are received through apertures defined in the bumper for carrying a wire harness.

In vehicles having a rear tailgate, such as minivans, sport utility vehicles and the like, the rear bumper is disposed rearwardly and slightly below the rear tailgate. Garnish or trim plates are sometimes secured to the bumper for improving the aesthetics of the bumper and/or the functionality of the bumper. For example, a step garnish or cover plate can be secured to an upper side of the rear bumper for providing a clean, durable, non-slip surface on the upper side of the bumper. A skid garnish can also be secured to the bumper, usually at a lower back portion of the bumper and extending to an underside of the bumper.

More recently, an increasing number of vehicle components are housed or disposed within vehicle bumper assemblies. For example, components disposed within the bumper can include turn signals or flashers, parking lights, reverse lights, cameras, and sensors (e.g., distance sensors or corner sensor), etc. These components are typically wired to receive electrical power and can also be wired to send and/or receive electrical communications. A wire harness can be employed when two or more wires extend along a common path. One design consideration in bumper assemblies having such components involves determining how to support any wires or wire harnesses running through the bumper assembly to these components.

One known support structure for carrying a wire or wire harness is a clip. One or more clips can be provided inside the bumper assembly for carrying the wires or wire harness along the bumper assembly. In known bumper assemblies, the clips can be attached to the bumper by adhering a portion of the clip to an interior surface of the bumper. Alternatively, the clips can each be formed integrally with the bumper or secured within holes defined in the bumper. In some applications, a mounting structure is adhered to, integrally formed with, or secured in a hole of the bumper, and a corresponding clip is connected to the mounting structure.

When a hole is provided in the bumper for a clip or clip's mounting structure, the skid garnish can be used to overlay the hole and hide it from view. Likewise, when a clip or mounting structure is integrally formed with the bumper, the skid garnish can be used to overlay the exterior surface opposite the integrally formed clip or mounting structure to hide any sink marks formed in the bumper. While use of the skid garnish to hide cosmetic defects (i.e., holes or sink marks) in the bumper is effective, it limits the locations at which clips can be used to carry wires or wire harnesses in the bumper assembly. In particular, mounting locations are limited to areas covered by the skid garnish. The locations at which clips or mounting structures can be adhered to an interior surface of the bumper beam are not so limited, but adherence of each clip or mounting structure is laborious resulting in increased production costs for the vehicle.

SUMMARY

According to one aspect, an improved rear bumper assembly is provided. More particularly, in accordance with this aspect, the rear bumper assembly includes a bumper body having an exterior surface and an interior surface. The bumper body defines at least one aperture therethrough. The at least one aperture is located on an upper portion of the bumper body. A step garnish is received on the upper portion and secured to the bumper body. At least one carrying structure is integrally molded on an underside of the step garnish and is received through the at least one aperture of the bumper body for carrying a wire or wire harness along the interior surface of the bumper body.

According to another aspect, an improved bumper assembly is provided. More particularly, in accordance with this aspect, the bumper assembly includes a bumper body extending laterally across a vehicle. The bumper body has an upper portion oriented approximately horizontally and a face portion oriented approximately vertically. A step garnish has an underside surface mounted to the upper portion of the bumper body and a show surface. The step garnish includes a plurality of integrally formed wire harness carrying structures extending from the underside of the surface. Each of the plurality of wire harness carrying structures is received through a corresponding aperture defined through the bumper body on the upper portion thereof to carry a wire harness within the bumper body adjacent the face portion.

According to still another aspect, a method of assemblying a rear bumper beam is provided. More particularly, in accordance with this aspect, a step garnish is installed to a bumper body, including passing integrally molded carrying structures formed on an underside of the step garnish through corresponding apertures defined in the bumper body. At least one corner sensor is installed onto the bumper body. A wire harness is operatively connected to the at least one corner sensor. The wire harness is attached to the carrying structures that extend into the bumper body through the corresponding apertures.

DETAILED DESCRIPTION

Figure 1:
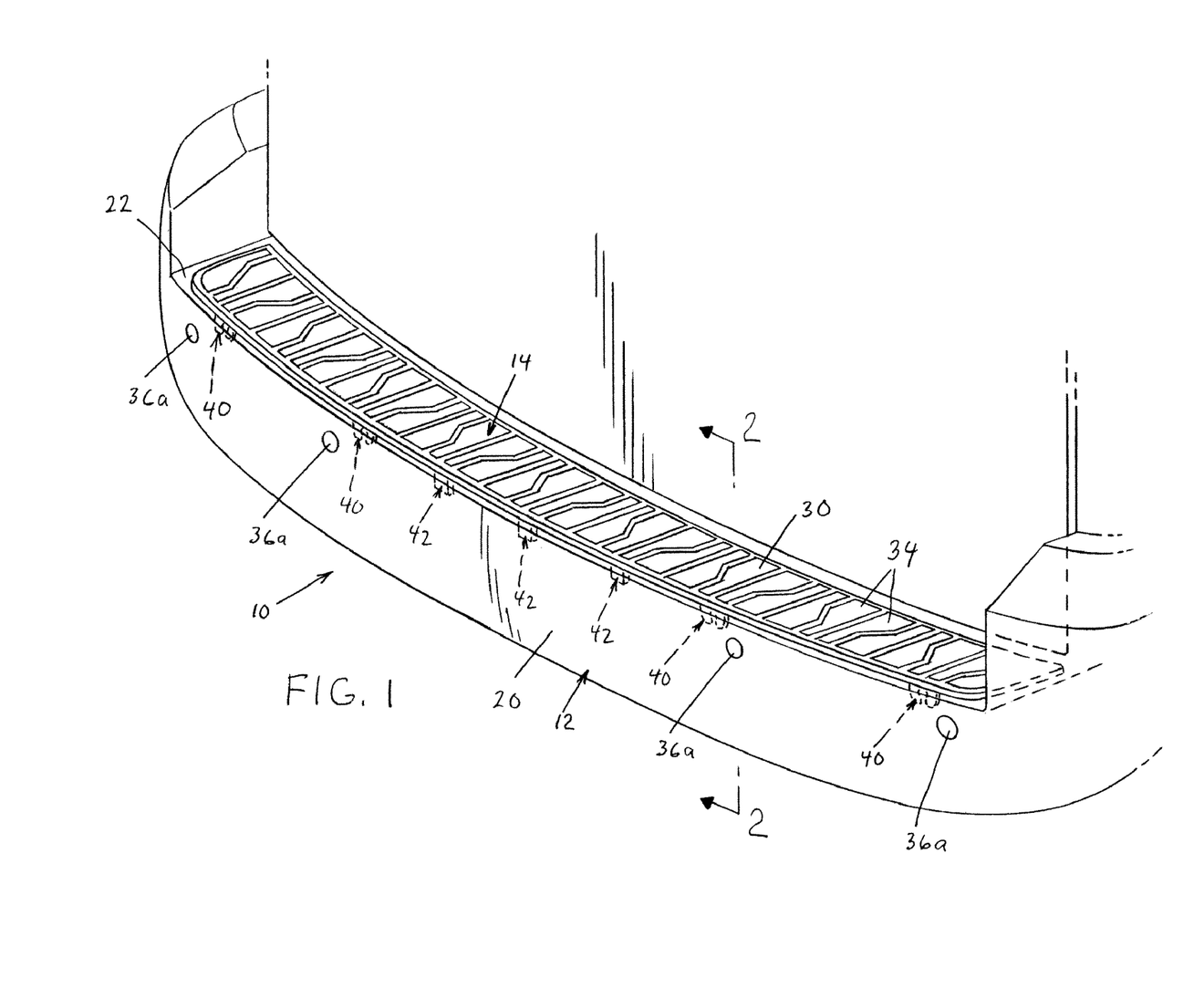
FIG. 1 is perspective view of a rear bumper assembly for a vehicle.
Figure 2:
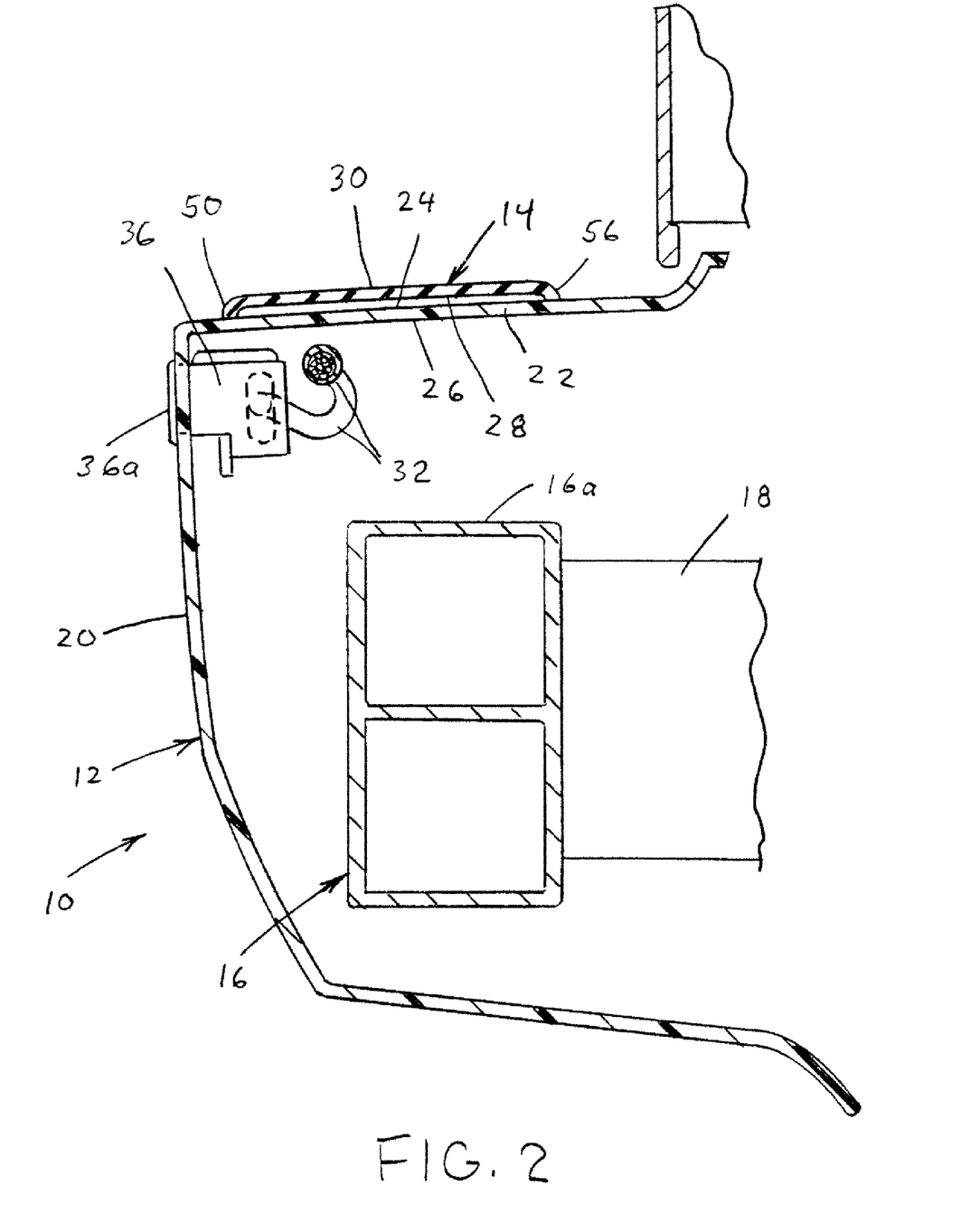
FIG. 2 is a cross sectional view of the bumper assembly taken along the line 2-2 of FIG. 1.

Referring now to the drawings, wherein the showings are for purposes of illustrating one or more exemplary embodiments, FIGS. 1 and 2 illustrate an improved rear bumper assembly 10 for a vehicle that includes a bumper body 12 and a step garnish 14 secured to the bumper body 12. As is known and understood by those skilled in the art, the bumper assembly 10 can further include a bumper beam 16 extending laterally across the vehicle between a pair of spaced apart frame rails 18, the bumper body 12 being secured (directly or through the vehicle's body) to the bumper beam 16 in a conventional manner as is known and understood by those skilled in the art and enclosing the bumper beam 16 such that it resides within the bumper body 12.

The bumper body 12, which extends laterally across the vehicle along with the bumper beam 16, can be formed by injection-molding, and integrally includes a face portion 20 oriented approximately vertically and an upper portion 22 oriented approximately horizontally. In addition, the bumper body 12 has an exterior surface 24 against which the step garnish 14 is received on the upper portion 22, and an interior surface 26 facing the bumper beam 16. As will be described in more detail below, the bumper body 12 defines at least one aperture (e.g., aperture 44 in FIG. 5 or aperture 46 in FIG. 7) therethrough that is located on the upper portion 22.

The step garnish 14 has an underside surface 28 mounted to the upper portion 22 of the bumper body 12 and a show surface 30 opposite the underside surface 28. As will be described in more detail below, at least one carrying structure (e.g., integrally formed carrying structure 40 and/or 42) is integrally molded on the underside 28 of the step garnish 14 and received through the at least one aperture of the bumper body 12 for carrying a wire harness 32 along the interior surface 26 of the bumper body 12. The step garnish 14 can be formed of a flexible and/or slip-resistant material, such as rubber or a rubber-like material, various plastics (e.g., polypropylene), etc. In the illustrated embodiment, the show surface 30 of the step garnish 14 includes a plurality of raised traction elements 34 (FIG. 1) provided along the longitudinal length of the step garnish 14 to prevent or at least reduce slipping.

The wire harness 32 can be used to supply power and/or relay electrical communications with one or more components mounted near or within the rear bumper assembly 10. For example, in the illustrated embodiment, corner sensors 36 are mounted to the bumper body 12, particularly the face portion 20 of the bumper body 12, and the wire harness 32 is operatively connected to each corner sensor 36 for providing power and relaying electrical communications.

Figure 3:
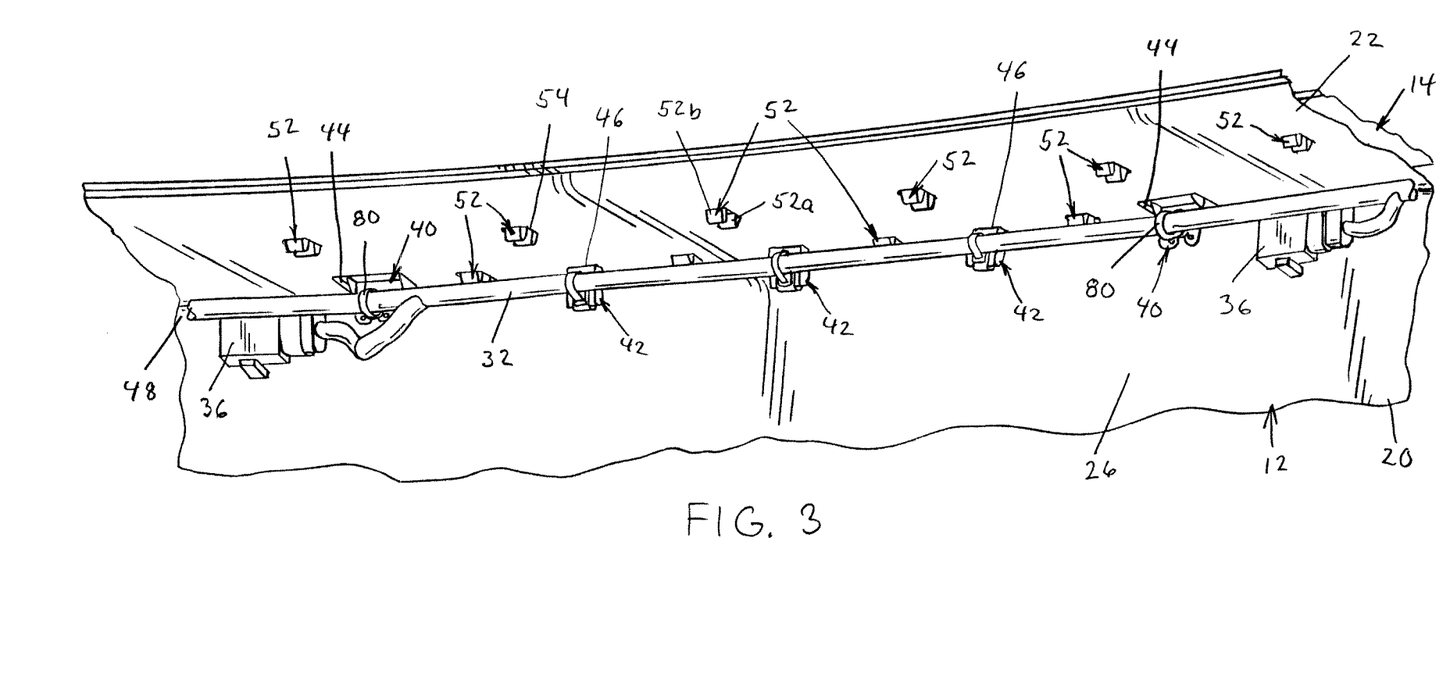
FIG. 3 is a partial perspective view of the inside of the bumper assembly showing a wire harness carried by clips secured to a step garnish of the bumper assembly.
Figure 4:
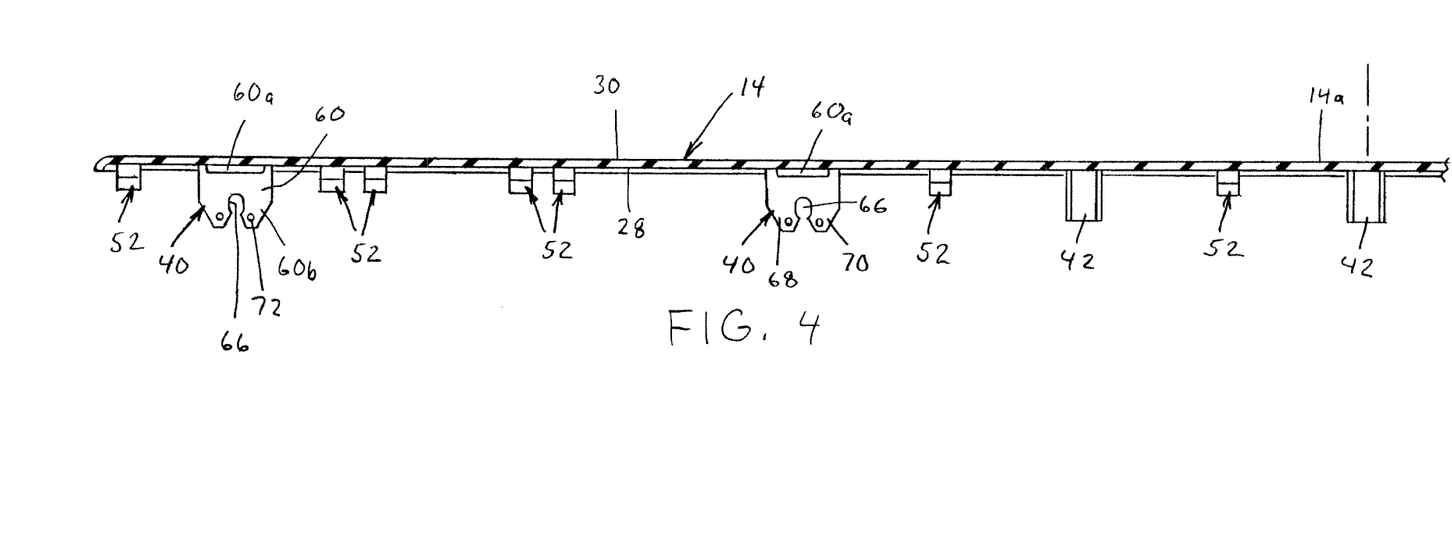
FIG. 4 is a partial cross sectional view of the step garnish showing integrally molded carrying structures extending from an underside of the step garnish.

With additional reference to FIGS. 3 and 4, the step garnish 14 of the illustrated embodiment includes a first set or first plurality of integrally formed wire harness carrying structures 40 and a second set or second plurality of integrally formed wire harness carrying structures 42. The carrying structures 40,42 extend from the underside surface 28 of the step garnish 14 and are respectively received within or through corresponding apertures 44,46 defined through the bumper body 12 on the upper portion 22 thereof to carry the wire harness 32 within the bumper body 12 adjacent the face portion 20. As shown, the wire harness 32 is carried by the structures 40,42 at an elevation that is between an upper side 16a of the bumper beam 16 and the upper portion 22 at the bumper body 12.

In the illustrated embodiment, three carrying structures 42 spaced apart from one another along a central portion 14a of the step garnish 14 form the second set of carrying structures and two carrying structures 40 disposed on either side of the three carrying structures 42 form the first set of carrying structures. That is, three carrying structures 42 (i.e., forming the second set or plurality) are flanked by respective pairs of carrying structures 40 (i.e., forming the first set or plurality) in the illustrated embodiment, though this particular arrangement and number of carrying structures 40,42 can vary. As illustrated, each of the carrying structures 40,42 extends through its corresponding aperture 44,46 a distance sufficient to carry the wire harness 32 along the face portion 20 of the bumper body 12. Accordingly, the apertures 44,46 are located on the upper portion 22 adjacent an intersection 48 between the face portion 20 and the upper portion 22.

In addition to the carrying structures 40,42, which are all disposed adjacent a rearward edge 50 of the step garnish, the step garnish 14 can also include a plurality of integrally molded clip or attachment structures 52 extending from the underside 20 of the step garnish 14. The clip structures 52 are received through corresponding apertures 54 defined in the bumper body 12 for securing the step garnish 14 to the bumper body 12. The clip structures 52 can be disposed at various locations about the underside surface 28 of the step garnish 14. In the illustrated embodiment, a first row of clip structures 52 is disposed generally in line with the wire harness carrying structures 40,42 and a second row of clip structures 52 is disposed in spaced relation relative to the first row of clip structures (i.e., more adjacent a second or forward edge 56 of the step garnish). In the illustrated embodiment, each of the clip structures 52 can be formed of resilient prongs 52a, 52b which snap into the corresponding aperture 54 defined in the bumper body 12 and the edges 50,56 of the step garnish 14 are raised to slightly space apart the main body of the step garnish from the upper portion 22.

Figure 5:
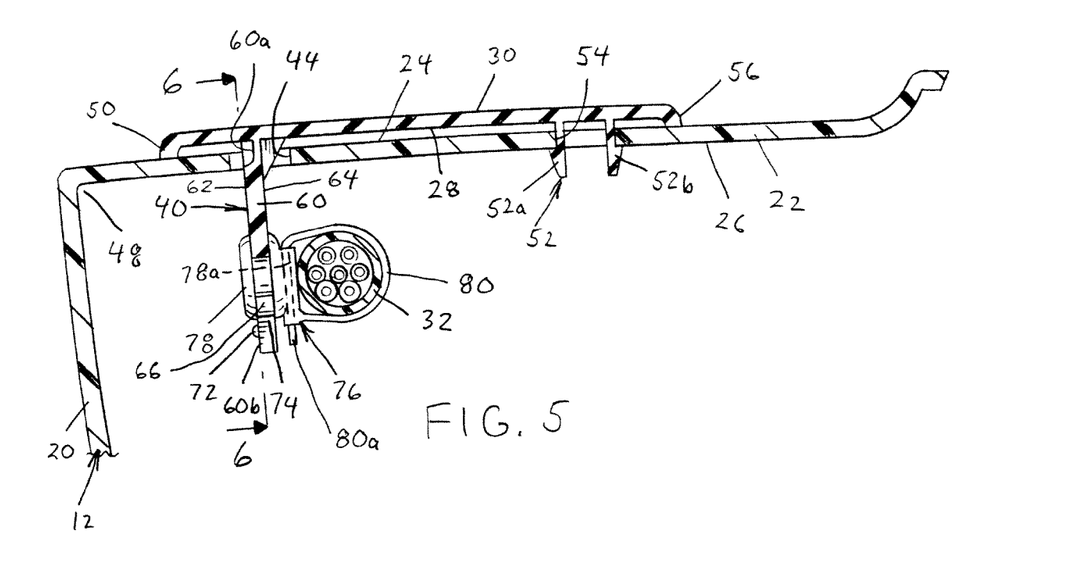
FIG. 5 is a partial cross sectional view of the bumper assembly taken through a slotted one of the carrying structures and showing the wire harness carried by a clip attached to the illustrated carrying structure.
Figure 6:
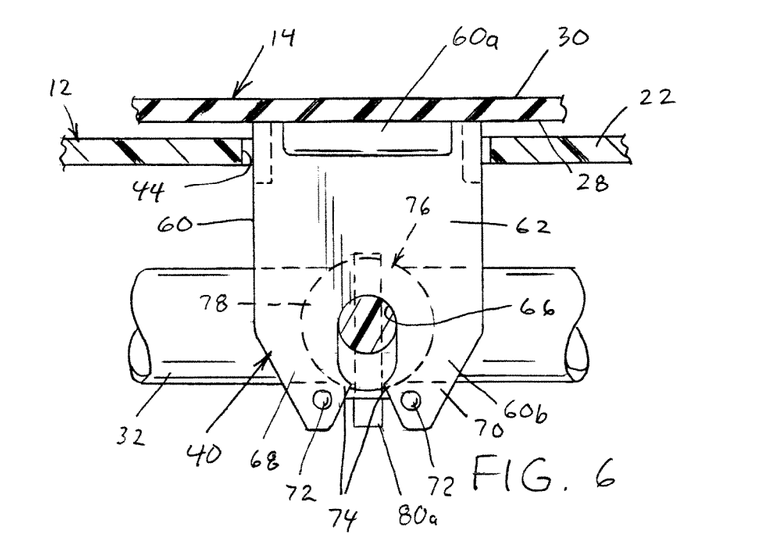
FIG. 6 is a partial cross sectional view taken along the line 6-6 of FIG. 5.

With reference to FIGS. 5 and 6, one of the carrying structures 40 is shown in cross-section carrying the wire harness 32. As shown, the structure 40 has a thin profile and is formed as a wall 60 extending approximately orthogonally from the underside 28 of the step garnish 14. The structure 40 extends through the corresponding aperture 44 in the bumper body 12 a distance sufficient to carry the wire harness 32 along the face portion 20 of the bumper body. The wall 60 includes a first surface 62 facing and approximately parallel to the interior surface 26 of the face portion 20 of the bumper body 12. The wall 60 further includes a second, opposite surface 64 narrowly spaced apart from the first surface 62 to provide a thin wall thickness between the first and second surfaces 62,64.

As illustrated, the first and second surfaces 62,64 respectively extend in a direction parallel to a longitudinal length of the step garnish 14 and thus the thin profile of the structure 40 is approximately parallel to a longitudinal length of the bumper body 12. The aperture 44 through the bumper body 12 has an elongated slot shape that accommodates the thin profile of the carrying structure 40. The structure 40, and particularly the wall 60, includes a proximal portion 60a adjacent and connected to the underside 28 of the step garnish 14 and a distal portion 60b spaced apart from the underside 28. As shown, the proximal portion 60a, which passes through aperture 44, has a thickness narrower (at least along a majority of a width of the wall 60) than a thickness of the distal portion 60b to limit any sink mark appearing in the show surface 30 of the step garnish 14.

The distal portion 60b defines a receiving aperture 66 for carrying the wire harness 32. More particularly, the distal portion 60b includes a first arm 68 and a second arm 70 spaced apart from the first arm 68, the arms 68,70 together defining the aperture 66 as a slot with an open end. The arms 68,70 each include a raised element, such as illustrated raised ball portions 72, adjacent distal ends of the arms 68,70, and also include inwardly facing retaining portions 74. A wire harness clip or clip structure 76 is received within the slot-shaped receiving aperture 66 and thus the wall 60 defines the open ended slot 66 between the arms 68,70 in which the clip 76 is removably received so as to be received or disposed within the bumper body 12.

The wire harness clip 76 includes a grooved base portion 78 which is removably received within the aperture 66 and retained in an aperture 66 by the raised elements 72 and/or the retaining portions 74. The clip 76 also includes a loop portion 80 having a proximal end integrally formed with the base portion 78 and then extends approximately orthogonally from the base portion 78 and from the second surface 64 of the structure 40 (when the clip 76 is in the aperture 66). A distal end 80a of the loop portion 80 loops or wraps around and is received within an aperture 78a of the base portion 78 As shown, the wire harness 32 is passed or received through the loop portion 80 of the clip 76 as the wire harness 32 extends longitudinally through the bumper body 12.

Figure 7:
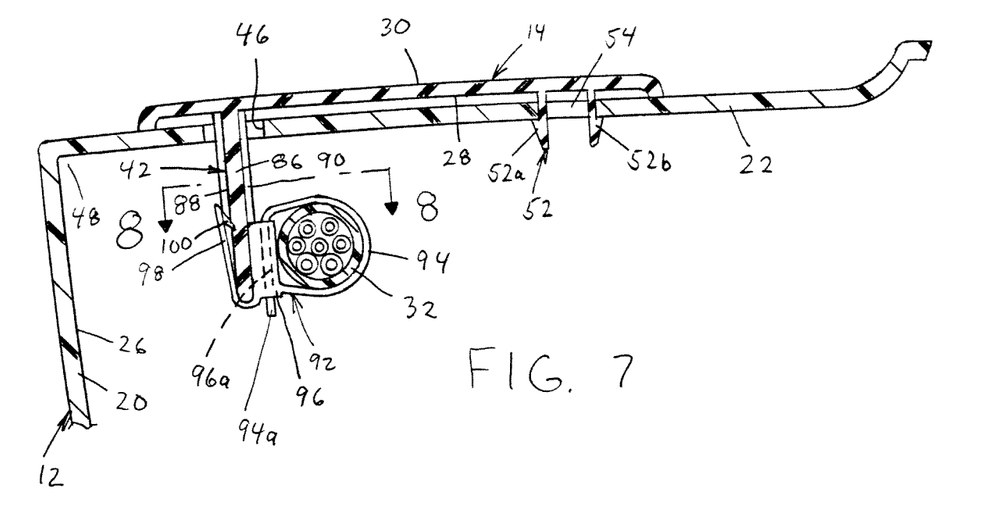
FIG. 7 is a partial cross sectional view of the bumper assembly taken through an I-shaped one of the carrying structures and showing the wire harness carried by a clip attached to the illustrated carrying structure.
Figure 8:
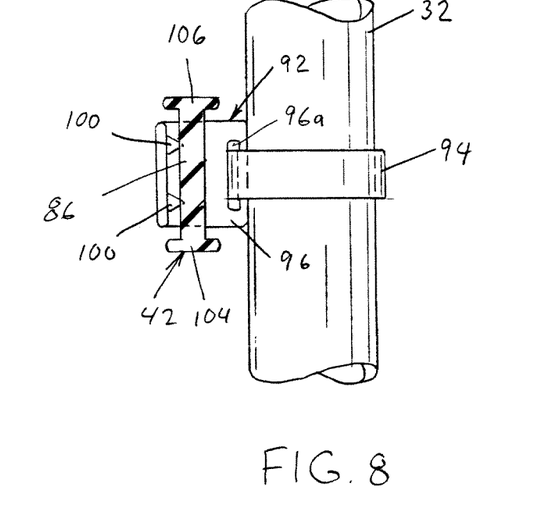
FIG. 8 is a partial cross sectional view taken along the line 8-8 of FIG. 7.

With reference to FIGS. 7 and 8, one of the carrying structures 42 is shown in cross section carrying the wire harness 32. As shown, the carrying structure 42 extends through the corresponding aperture 46 in the bumper body 12 a distance sufficient to carry the wire harness 32 along the face portion 20 of the bumper body 12. Like the apertures 44, the apertures 46 for the structures 42 are located on the upper portion 22 of the bumper body adjacent the intersection 48 between the upper portion 22 and the face portion 20. Like the carrying structure 40, the carrying structure 42 is formed as a wall 86 extending approximately orthogonally from the underside 28 of the step garnish 14. The wall 86, and thus the carrying structure 42, includes a first surface 88 facing and approximately parallel to the interior surface 26 of the face portion 20 of the bumper body 12 and a second, opposite surface 90 narrowly spaced apart from the first surface 88. The first and second surfaces 88,90 extend in a direction generally parallel to a longitudinal length of the step garnish 14. The narrow spacing of the surfaces 88,90 relative to one another gives the carrying structure 42 a thin profile. The carrying structure 42 can further include stabilizing end walls 104, 106 providing the carrying structure 42 with an I-shaped profile, as best seen in FIG. 8. The aperture 46 through the bumper body 12 can be formed to substantially match the shape of the carrying structure 42.

A clip or clip structure 92 is removably attached to the carrying structure 42 for carrying the wire harness 32. More particularly, the clip 92 includes a loop portion 94 having a proximal end formed integrally with a base portion 96 and then extends approximately orthogonally from the base portion 96 and from the second surface 90 of the wall 86 (when the clip 92 is attached to the carrying structure 42). A distal end 94a of the loop portion 94 loops or wraps around and is received within an aperture 96a of the base portion 96. The wire harness 32 is received through the loop portion 94 as it extends longitudinally through the bumper body 12. The base 96 includes a retaining tab 98 that resiliently or frictionally connects to the wall 86. The retaining tab 98 can include barbs 100 to prevent accidental removal of the clip 92 from the clip structure 42.

One advantage of the disclosed rear bumper assembly 10, and particularly of the step garnish 14, is that it allows one or more of the corner sensors 36 and/or the harness 32 to be mounted at a higher elevation (e.g., about 5 mm) than the bumper beam 16, and particularly the upper surface 16a thereof. This can increase the likelihood of the corner sensors 36 and any related hardware surviving a minor collision, which is advantageous in that it can reduce repair costs (and Insurance Institute for Highway Safety or IIHS repair estimates) and increase consumer satisfaction. In particular, the sensors 36 can be mounted in locations less likely to be damaged in a low speed crash by the disclosed bumper assembly 10.

A method of assemblying the rear bumper beam 12 will now be described. First, the step garnish 14 can be installed to the bumper body 12. This can include passing the integrally molded carrying structures 40, 42 formed on the underside 28 of the step garnish 14 through corresponding apertures 44,46 defined in the bumper body 12, particularly in the upper portion 22 of the bumper body 12. This can also include snap-fitting the clip structures 52 into their corresponding apertures 54. Next, the corner sensors 36 can be installed onto the bumper body 12. This can be done in a conventional manner such that a sensor portion 36a (FIG. 2) of each corner sensor 36 passes through the face portion 20 of the bumper body 12 and the corner sensor 36 is securely mounted to the interior surface 26 of the face portion 20 of the bumper body 12.

The wire harness 32 can be operatively connected to each of the corner sensors 36 for providing power and/or electrical communications therewith. In addition, the wire harness 32 can be attached to the carrying structures 40,42 that extend into the bumper body 12 through the corresponding apertures 44,46. More particularly, attaching the wire harness 32 to the carrying structures 40,42 can include connecting the wire harness carrying clips 76,92 to corresponding carrying structures 40,42 and passing the wire harness 32 through respective looped portions 80,94 of the clips 76,92. If desired, the clips 76,92 could be subassembled to the wire harness 32 prior to correcting the clips 76,92 to their respective carrying structures 40,42. Connecting clips 76 to the carrying structures 40 can include snap fitting a mounting or grooved base portion 78 of the clip 76 into an open ended slot aperture 66 defined by the carrying structure 42 and inserting the distal end 80a at the loop portion 80 into the aperture 78a. Connecting the clip 92 to the carrying structure 42 can include snap fitting a retaining tab 98 onto a wall portion 86 of the carrying structure 42 and inserting distal end 94a of the loop portion 94 into the aperture 96a. Advantageously, the disclosed mounting method prevents or limits the wire harness 32 from sagging and getting caught on the bumper beam 16 during installation.

It will be appreciated that various of the above-disclosed and other features and functions, or alternative thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A rear bumper assembly, comprising:
   a bumper body having an exterior surface and an interior surface, said bumper body defining at least one aperture therethrough, said at least one aperture located on an upper portion of said bumper body;
   a step garnish received on said upper portion and secured to said bumper body; and
   at least one carrying structure integrally molded on an underside of said step garnish and received through said at least one aperture of the bumper body, said at least one carrying structure carrying a wire or wire harness along said interior surface of said bumper body.

2. The rear bumper assembly of claim 1 wherein each of said at least one carrying structure extends through said aperture a distance sufficient to carry said wire harness along a face portion of said bumper body, said at least one aperture located on said upper portion adjacent an intersection between said upper portion and said face portion.

3. The rear bumper assembly of claim 2 wherein said at least one carrying structure includes an integrally molded proximal portion adjacent and connected to said underside of said step garnish and an integrally molded distal portion spaced apart from said underside, said proximal portion having a width narrower than a width of said distal portion to limit any sink mark in a show surface of said step garnish, said distal portion defining a receiving aperture for carrying said wire harness.

4. The rear bumper assembly of claim 3 wherein said distal portion includes a first arm and a second arm together defining said receiving aperture as a slot with an open end.

5. A rear bumper assembly comprising:
a bumper body having an exterior surface and an interior surface, said bumper body defining at least one aperture therethrough, said at least one aperture located on an upper portion of said bumper body;
a step garnish received on said upper portion and secured to said bumper body;
at least one carrying structure integrally molded on an underside of said step garnish and received through said at least one aperture of the bumper body for carrying a wire or wire harness along said interior surface of said bumper body, wherein each of said at least one carrying structure extends through said aperture, said at least one carrying structure includes a set of carrying structures each having a proximal portion adjacent and connected to said underside of said step garnish and a distal portion spaced apart from said underside, said distal portion defining a receiving aperture for carrying said wire harness; and
a clip resiliently received in said receiving aperture, said clip including a loop portion through which a wire harness passes.

6. The rear bumper assembly of claim 1 wherein said at least one carrying structure is formed as a wall extending approximately orthogonally from said underside of said step garnish and includes a first surface facing and approximately parallel to said interior surface of said bumper body and a second, opposite surface narrowly spaced apart from said first surface.

7. The rear bumper assembly of claim 6 wherein said first and second surfaces extend in a direction parallel to a longitudinal length of said step garnish.

8. A rear bumper assembly, comprising:
a bumper body having an exterior surface and an interior surface, said bumper body defining at least one aperture therethrough, said at least one aperture located on an upper portion of said bumper body;
a step garnish received on said upper portion and secured to said bumper body;
at least one carrying structure integrally molded on an underside of said step garnish and received through said at least one aperture of the bumper body for carrying a wire or wire harness along said interior surface of said bumper body; and
wherein said at least one carrying structure is formed as a wall extending approximately orthogonally from said underside of said step garnish and includes a first surface facing and approximately parallel to said interior surface of said bumper body and a second, opposite surface narrowly spaced apart from said first surface, and said first and second surfaces extending in a direction parallel to a longitudinal length of said step garnish and said wall defining an open ended slot in which a wire harness clip is removably received.

9. The rear bumper assembly of claim 8 wherein said wire harness clip includes a loop portion extending approximately orthogonally from said second, opposite surface of said at least one carrying structure, a wire harness received through said loop portion as said wire harness extending longitudinally through said bumper body.

10. The rear bumper assembly of claim 1 wherein said step garnish includes integrally molded clip structures extending from said underside, said clip structures received through corresponding apertures defined in said bumper body for securing said step garnish to said bumper body.

11. A bumper assembly, comprising:
a bumper body extending laterally across a vehicle, said bumper body having an upper portion oriented approximately horizontally and a face portion oriented approximately vertically; and
a step garnish having an underside surface mounted to said upper portion of said bumper body and a show surface, said step garnish including a plurality of integrally formed wire harness carrying structures extending from said underside surface, each of said plurality of wire harness carrying structures received through a corresponding aperture defined through said bumper body on said upper portion thereof to carry a wire harness within said bumper body adjacent said face portion.

12. The bumper assembly of claim 11 wherein said show surface of said step garnish includes a plurality of raised traction elements provided along the longitudinal length of said step garnish.

13. The bumper assembly of claim 11 further including:
a clip secured to each of said plurality of said carrying structures and being disposed within said bumper body; and
a wire harness passed through a loop portion of said clip.

14. The bumper assembly of claim 13 further including:
a corner sensor mounted in a face portion of said bumper body, said wire harness operatively connected to said corner sensor.

15. The bumper assembly of claim 13 further including a bumper beam extending laterally across said vehicle within said bumper body, said wire harness carried by said plurality of carrying structures at an elevation between an upper side of said bumper beam and said upper portion of said bumper body.

16. The bumper assembly of claim 11 wherein each of said plurality of said carrying structures has a thin profile including a first surface facing bumper body, a second surface opposite said first surface, and a wall thickness provided therebetween, said profile approximately parallel to a longitudinal length of said bumper body, each corresponding aperture through said bumper body having an elongated slot shape for accommodating said thin profile of each of said plurality of said carrying structures.

17. The bumper assembly of claim 11 wherein said step garnish includes a plurality of integrally molded attachment structures received in corresponding apertures in said bumper body for securing said step garnish to said bumper body.

18. A method of assembling a rear bumper beam, comprising:
installing a step garnish to a bumper body, including passing integrally molded carrying structures formed on an underside of said step garnish through corresponding apertures defined in said bumper body;
installing at least one corner sensor onto said bumper body;
operatively connecting a wire harness to said at least one corner sensor; and attaching said wire harness to said carrying structures that extend into said bumper body through said corresponding apertures.

19. The method of claim 18 wherein attaching said wire harness to said carrying structures includes:
   connecting a wire harness carrying clip to each of said carrying structures; and
   passing said wire harness through a looped portion of said clip.

20. The method of claim 19 wherein connecting said wire harness carrying clip includes snap fitting said clip into an open ended slot aperture defined by each of said carrying structures.

21. The rear bumper assembly of claim 5 wherein said proximal portion has a width narrower than a width of said distal portion to limit any sink mark in a show surface of said step garnish.

* * * * *